United States Patent [19]
Kadnier

[11] Patent Number: 6,097,520
[45] Date of Patent: Aug. 1, 2000

[54] REMOTE CONTROL RECEIVER AND METHOD OF OPERATION

[75] Inventor: Griffith W. Kadnier, Edmonds, Wash.

[73] Assignee: Microsoft Corporation, Redmond, Wash.

[21] Appl. No.: 08/884,964

[22] Filed: Jun. 30, 1997

[51] Int. Cl.[7] .................................................. H04B 10/00
[52] U.S. Cl. ...................... 359/142; 340/825.62; 348/734
[58] Field of Search .......................... 359/142; 455/151.2; 348/734; 371/47.1; 340/825.62, 825.63, 825.64; 174/798

[56] References Cited

U.S. PATENT DOCUMENTS

| | | | |
|---|---|---|---|
| 5,436,853 | 7/1995 | Shimohara | 359/142 X |
| 5,900,867 | 5/1999 | Schindler et al. | 345/327 |
| 5,903,259 | 5/1999 | Brusky et al. | 348/734 X |

*Primary Examiner*—Thomas Mullen
*Attorney, Agent, or Firm*—Leydig, Voit & Mayer, Ltd.

[57] ABSTRACT

A system for the detection of user-selected remote control commands from virtually any appliance remote control includes a hardware processor with self-clocking circuit to detect and sample an incoming data stream. The data are error-corrected and compressed to eliminate errors caused by ambient noise. The error-corrected data can be used to remotely control an appliance or computer. In a learn mode, the user enters a user-selected remote control button sequence which is detected, error-corrected, compressed, and stored. The user then designates a computer command to be associated with the user-selected remote control button sequence. A command storage area, such as a conventional database, stores the user-designated command in association with the user-selected remote control button sequence. In an execute mode, the system detects the user-entered remote control button sequence and performs the user-designated action.

68 Claims, 8 Drawing Sheets

REMOTE CONTROL RECEIVER AND METHOD OF OPERATION

TECHNICAL FIELD

The present invention relates generally to remote control receivers, and more particularly, to a universal remote control receiver and method of operation.

BACKGROUND OF THE INVENTION

Remote controls are commonly used with a number of household appliances. For example, remote controls are commonly used with televisions, video cassette recorders, stereo equipment, and the like. A typical remote control is designed to operate only with one component. One remote control device is required for operation of a television while another remote control device is required for operation of a video cassette recorder. In some cases, a manufacturer that makes multiple appliances, such as televisions and video cassette recorders, may provide a single remote control device capable of operating several appliances.

Also known in the art is the "universal" remote control. The universal remote control may be programmed to operate appliances of one or more manufacturers. Thus, a universal remote control may be used to operate a television manufactured by a first company and a video cassette recorder manufactured by a second company. The universal remote control must transmit data according to the different fixed formats of each manufacturer to successfully control the different appliances. The universal remote control transmits data in a first fixed format for operation with the fixed format of the receiver, and transmits data in a second fixed format for operation of the video cassette recorder manufactured by a second company. There are a variety of different techniques used to determine the proper data format for operation with various appliances manufactured by different companies. These are well known in the art.

One disadvantage of universal remote controls is their inability to adapt to the format of new appliances and the inability of the user to define the functions controlled through remote programming capability. Therefore, it can be appreciated that there is a significant need for a system and method for universal operation of remote controls and user control of the functions performed using remote programming. The present invention provides this and other advantages as will be illustrated by the following description and accompanying Figures.

SUMMARY OF THE INVENTION

The present invention is embodied in a system and method for processing command data transmitted from a remote control device to control a computer. The system comprises a remote control receiver to receive the command from the remote control device and to generate a serial bit stream in response thereto. A sampling circuit samples the serial bit stream to generate a plurality of bit stream samples. An error-correction process analyzes the plurality of bit stream samples to detect and correct errors contained within the bit stream samples. The error-correction processor generates a plurality of corrected bit stream samples corresponding to the remote command transmitted from the remote control device. The system also includes a command processor to determine a user selectable command corresponding to the remote command transmitted from the remote control device. The command processor passes the user selectable command to the computer for execution.

The system may include a storage location to store the user selectable command corresponding to the remote control command transmitted from the remote control device. The command processor uses the remote control command as a pointer to the storage location to determine the user selectable command. The storage location may include a plurality of user selectable commands corresponding to a plurality of respective remote commands transmitted from the remote control device. The command processor selects one of the user selectable commands corresponding to the respective remote control command transmitted from the remote control device and passes the selected user selectable command to the computer for execution.

In typical operation the command processor has first and second alternative operational modes. The command processor operates in the first mode to accept a user-selected computer command and to store the selected command in the storage location in association with a user-entered remote command from the remote control device. The command processor operates in the second mode, following operation in the first mode, to identify the user-entered remote command transmitted from the remote control device as corresponding to a user selectable computer command. The command processor passes the user-selected computer command to the computer for execution.

The system may also include a data compression processor to receive and compress the plurality of corrected bit stream samples. In one embodiment, the data compression processor uses run length encoding to compress the plurality of corrected bit stream samples.

The system may also include a detection circuit to detect a first leading edge of the serial bit stream generated by the remote control receiver. The serial bit stream includes a plurality of pulses, each having a leading edge, and having a maximum period between each of the pulses. The system further includes a clock generating circuit to generate a sampling clock in response to the first leading edge. The clock generating circuit terminates the sampling clock when the maximum period expires without an additional one of the plurality of pulses. The sampling circuit receives the sampling clock and samples the serial bit stream from the remote control receiver to generate the plurality of bit stream samples.

DETAILED DESCRIPTION OF THE INVENTION

Figure 1A:
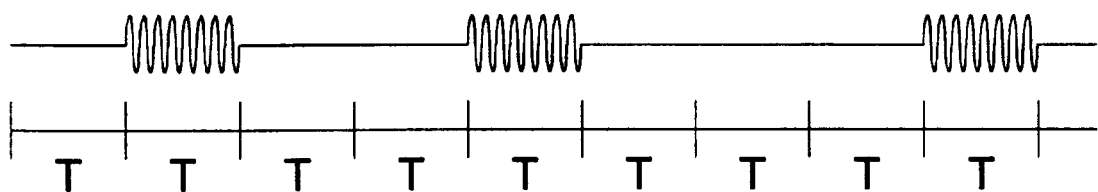
FIG. 1A is a waveform generated by one class of conventional emote control devices.
Figure 1B:
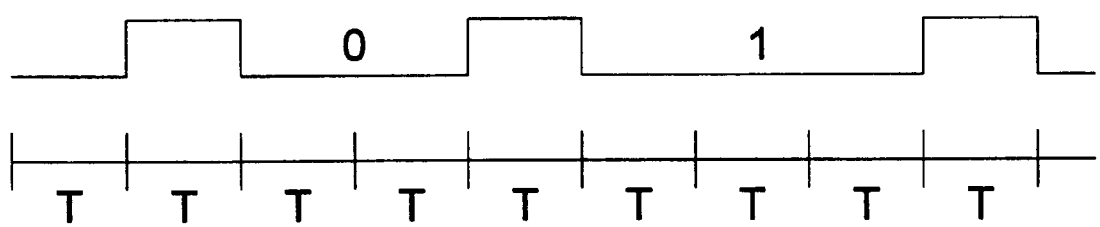
FIG. 1B is the output waveform of a conventional receiver in response to the remote control waveform of FIG. 1A.

The vast majority of remote control devices use infrared (IR) signals to transmit digital data from the remote control to a receiver within an appliance. The format for data transmitted by the infrared remote control devices is governed by international standards. The conventional IR remote control transmits an encoded data sequence each time the user depresses a key. The IR remote control transmits a digital sequence that includes start data bits, identification data bits and command data bits. In one standard, designated as the "RECS 80" encoding standard, data is encoded using pulse length modulation. Each data bit transmitted by the IR remote control is encoded by a high logic level of a duration T followed by a low logic level of duration 2T to represent a logic zero data bit or a low level duration of 3T to represent a logic one data bit. FIG. 1A illustrates a data waveform generated by a typical IR remote control using the RECS 80 encoding standard. The digital data themselves are modulated using a 38–40 kilohertz (kHz) carrier. A high logic level is represented by a burst of oscillations while a low logic level contains no oscillations. FIG. 1B illustrates the output signal generated by a conventional IR receiver in response to the reception waveform of FIG. 1A. The modulated carrier signal permits the use of a filter tuned to the carrier frequency thus allowing the receiver to distinguish the control signals from noise caused by ambient light, such as fluorescent lamps.

With the RECS 80 code standard, the transmission of a logic 1 takes more time (3T) than does the transmission of a logic 0 (2T). Other standards, such as "RC5," transmit data with a uniform duration for all bits. A logic 0 is encoded, using the RC5 code standard, by generating a transition in the middle of a time interval assigned to each bit. A logic 0 is encoded by a high to low transition while a logic 1 is encoded by a low to high transition. This is known as a "biphase" code.

As discussed in the Background of the Invention, attempts have been made to produce a universal remote control that is capable of operation with a plurality of appliances. In contrast, the present invention is directed to a universal receiver which is capable of detecting and decoding data from virtually any infrared remote control. Furthermore, the system of the present invention provides the additional capability of user selection of remote control code sequences to cause a target computer to perform user-selected functions. That is, the user can program remote control code sequences to cause the target computer to perform user-specified functions.

Figure 2:
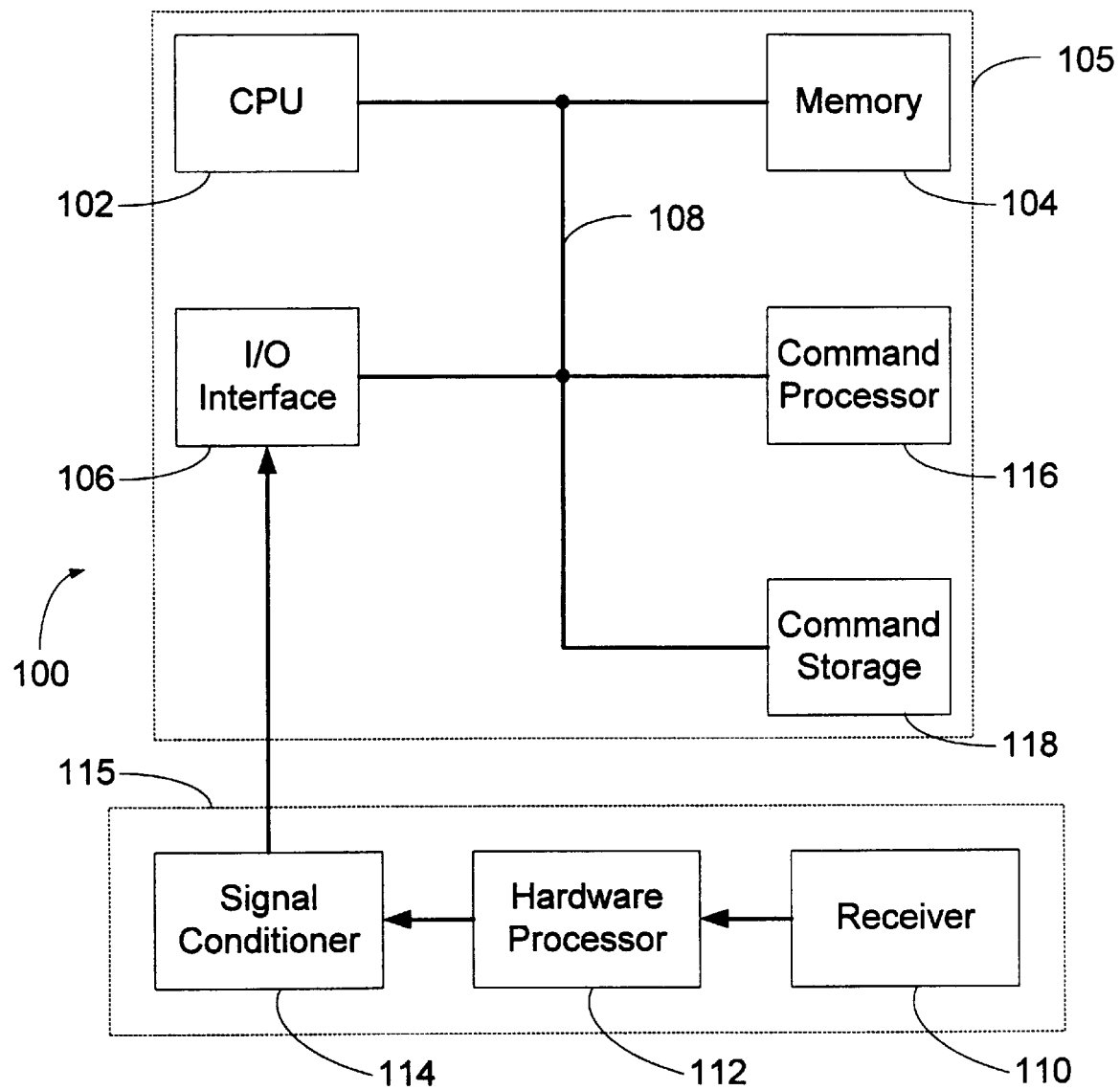
FIG. 2 is a functional block diagram of a system suitable for practicing an exemplary embodiment of the present invention.

The present invention is embodied in a system 100, illustrated in the functional block diagram of FIG. 2. The system 100 includes a CPU 102 and memory 104, which are typically contained within a target computer 105. Alternatively, the CPU 102 and the memory 104 may be part of a stand alone device that is coupled to the target computer 105. In addition, the system 100 includes an I/O interface 106 within the target computer 105. These components are coupled together by a system bus 108. The system bus 108 may carry power, control signals, and status signals in addition to data. The general operation of the CPU 102 and memory 104 is well known in the art and need not be discussed in detail herein except as related to the specific steps performed in decoding infrared control signals.

Within the target computer 105, a command processor 116 analyzes the data received from the IR remote control until it can reliably identify the button or buttons on the IR remote control selected by the user. The command processor 116 stores the now identified data in a command storage area 118. The IR remote control data are stored in the command storage area 118 in association with a command to be executed by the target computer 105. FIG. 2 illustrates the command processor 116 as an individual block. However, the CPU 102 may implement the functionality of the command processor 116.

The IR remote control signals are detected by a front-end processor 115 that includes a receiver 110 and processed by a hardware processor 112. The receiver 110 can be a conventional infrared receiver/demodulator unit, such as a Sharp GP1U52X IR receiver/demodulator unit. This particular unit comprises a combined IR detector and demodulator and generates a TTL-compatible output signal in which the 38–40 kHz carrier has been removed. Other conventional IR receivers may also be employed for the receiver 110.

The hardware processor 112 detects data generated by the receiver 110 and samples the generated data. A signal conditioner 114 receives the sampled data and performs error correction and data compression signal processing on the sample data. In an exemplary embodiment, the receiver 110, hardware processor 112, and signal conditioner 114 are part of a stand alone front-end processor 115. The hardware processor 112 is preferably implemented using CMOS or LSTTL components. This permits battery operation of the receiver 110 and hardware processor 112. The signal conditioner 114 may be implemented as software instructions executed by a microprocessor (not shown) in the front-end processor 115. Alternatively, the functions of the signal conditioner 114 may be implemented by the CPU 102 in the target computer 105. The data from the front-end processor 115 are coupled to the I/O interface 106 in the target computer 105. In an exemplary embodiment, the I/O interface 106 is a conventional serial port operating at 9600 baud. However, the I/O interface 106 may be any acceptable computer interface, such as a parallel port, network connection, or the like.

Figure 3:
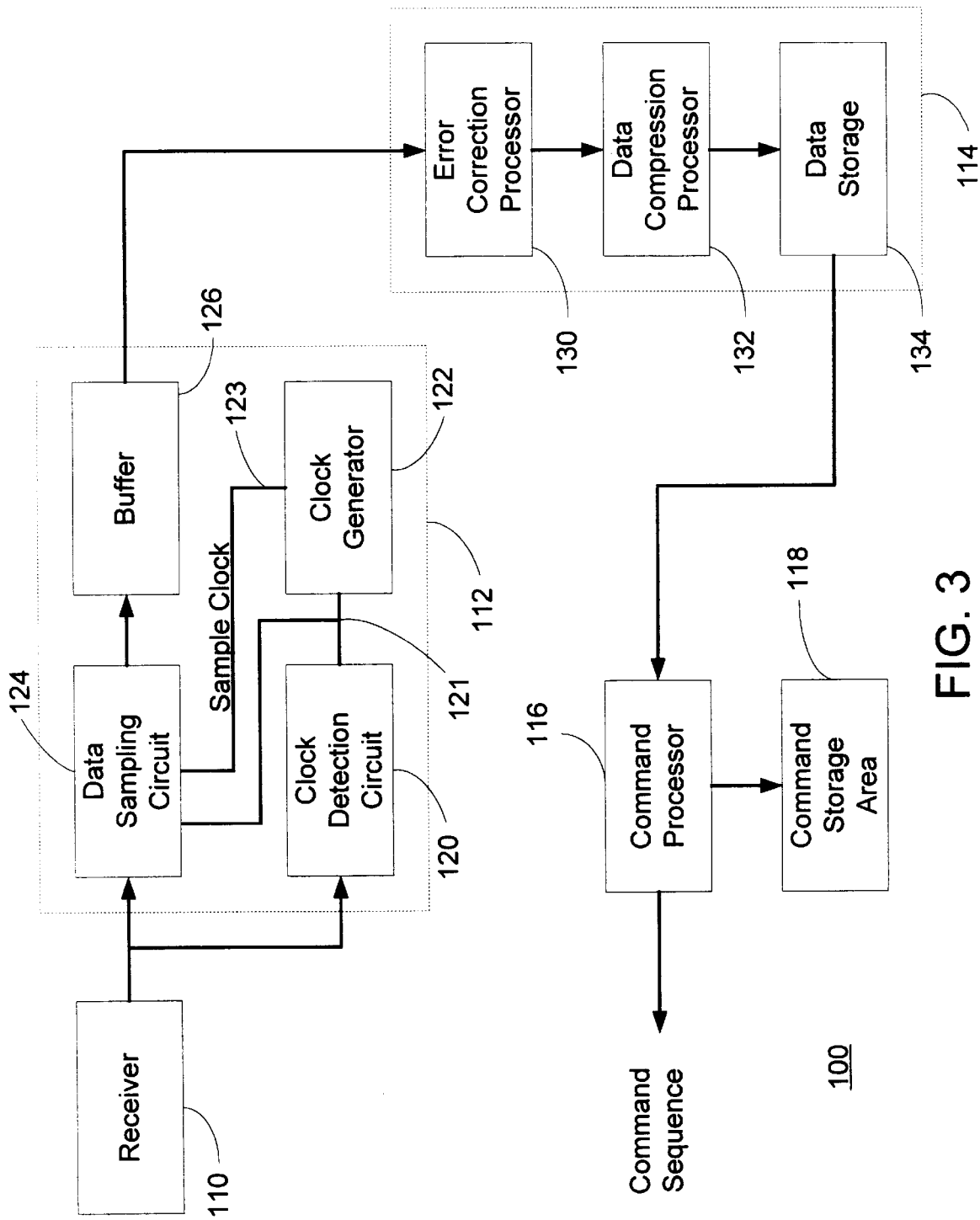
FIG. 3 is a more detailed functional block diagram of the system of FIG. 2.

A more detailed functional block diagram of the system 100 is provided in FIG. 3. The receiver 110 provides the TTL-compatible output signal for the hardware processor 112. The IR signal transmitted by the IR remote controller comprises a self-clocking bit stream with no start or stop data bits. Furthermore, the IR remote control signal often has variable timing so that transmission of a command may begin in the middle of a sequence and be repeated so that at least one complete sequence is transmitted. Therefore, the TTL-compatible output generated by the receiver 110 will be a TTL pulse train with no start or stop bits and pulse widths and pulse durations of variable lengths depending on the particular type of IR remote control. It should be noted that the pulse width and pulse interval for any given IR remote control will be fairly consistent. However, the system 100 is capable of operation with virtually any IR remote control. Therefore, the hardware processor 112 must be capable of detecting and processing TTL pulse trains with a wide range of variability.

The hardware processor 112 comprises a clock detection circuit 120, which detects a first transition of a TTL pulse from the output of the receiver 110. The clock detection circuit 120 generates an enable or gate signal 121 coupled to a clock generator 122. In turn, the clock generator 122 generates a sample clock signal 123. The clock detection circuit 120 will maintain the gate signal 121 so long as TTL pulses continue to be detected at the output of the receiver 110. While the pulse train has a wide range of variability, as discussed above, the period between pulses is never greater than 25 milliseconds (ms) for a single code from the IR controller. For example, when the user depresses a button, such as the digit "1," on an IR remote control, a pulse train corresponding to that button is generated. The pulses in the pulse train have no more than 25 ms intervals. Thus, the clock detection circuit will keep the clock generator gating signal active so long as a pulse is detected at least every 25 ms. When a period longer than 25 ms occurs, the clock detection circuit 120 deactivates the gate signal 121, thus disabling the clock generator 122.

So long as the gate signal 121 from the clock detection circuit 120 is active, the clock generator 122 generates a sample clock signal 123. In an exemplary embodiment, the sample clock has a sample frequency of approximately 80 kHz. The sample clock signal 123 controls sampling in a data sampling circuit 124. The data sampling circuit 124 may typically comprise a serial to parallel converter with the serial input being coupled to the output of the receiver 110 and the clock input for the serial to parallel converter being coupled to the sample clock signal 123. The sampling rate is sufficiently high that an accurate detection of the pulse train from the receiver 110 is assured. The high sampling rate also causes a high redundancy rate in the digital signal. As will be discussed in detail below, this redundancy advantageously allows error correction of the received signal, which is not known in the art.

Figure 4:
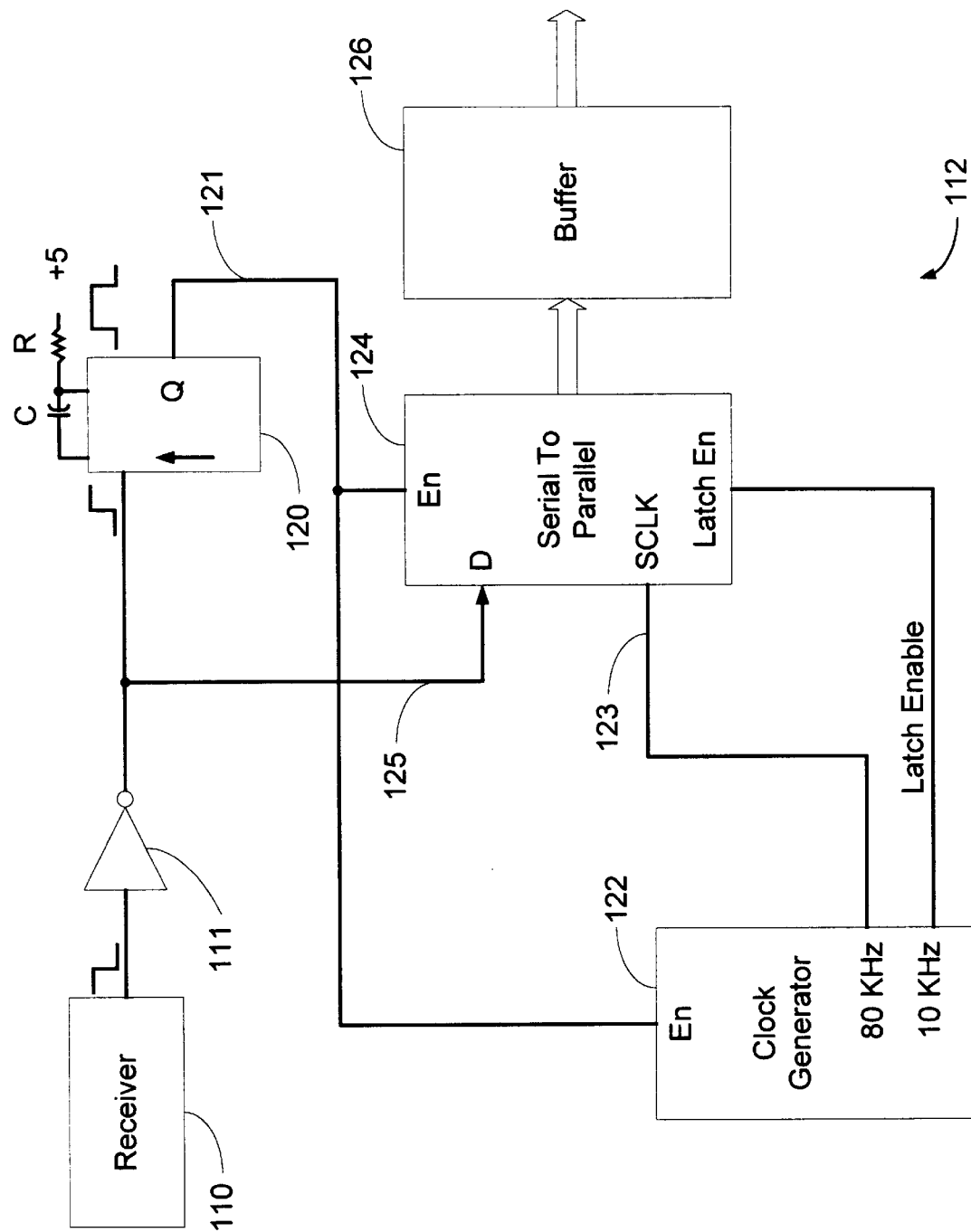
FIG. 4 is a schematic diagram illustrating one implementation of a hardware portion of the system of FIG. 2.

FIG. 4 is a schematic diagram illustrating one implementation of the hardware processor 112. As previously stated, the receiver 110 is a conventional IR detector demodulator. The particular receiver 110 illustrated in FIG. 4 has a normally high logic level and makes a transition to a low logic level upon detection of an IR signal. The low logic level is inverted by an inverter 111 which is coupled to the clock detection circuit 120 and data sampling circuit 124. In the embodiment illustrated in FIG. 4, the clock detection circuit 120 is a retriggerable monostable multivibrator, such as a 74 HC 4538. The monostable multivibrator retriggers on each rising edge of the signal from the inverter 111. The monostable multivibrator has a time period selected by a resistor R and capacitor C. These components are selected to provide the time period of 25 ms for the gate signal 121. The gate signal 121 enables the clock generator 122 and the data sampling circuit 124.

The clock generator 122 may be any suitable form of oscillator that provides the sample clock 123. As previously discussed, the sample clock 123 is selected to have a frequency of 80 kHz. In addition, the clock generator 122 generates a 10 kHz latch enable signal that is also coupled to the data sampling circuit. In an exemplary embodiment, the data sampling circuit 124 comprises a serial to parallel converter, such as a 74HC595 integrated circuit. The serial to parallel converter has a single data input 125 that is coupled to the output of the inverter 111. When a signal from the receiver 110 is detected, the inverter 111 triggers the clock detection circuit 120, which in turn enables the clock generator 122 and the data sampling circuit 124. The output of the inverter 111 is the data input to the serial to parallel converter. With an 80 kHz signal as the sample clock 123, there are typically 8 to 9 sample bits per pulse from the inverter 111. The sample clock 123 is enabled so long as the gate signal 121 is active. After each 8 sample pulses, the 10 kHz signal from the clock generator 122 activates the latch enable of the serial to parallel converter to transfer a byte of data from the data sampling circuit 124 to a buffer 126. Thus, the hardware processor 112 provides a unique self-clocking system that detects the initial transition of a signal from the receiver 110 independently of any timing requirements of the IR remote control. This advantageously allows the system 100 to operate satisfactorily with virtually any IR remote control.

In an exemplary embodiment, the buffer 126 provides 2 kilobytes (kBytes) of storage. This permits the retention of 16,000 sample bits from the receiver 110. At an 80 kHz clock rate, a sample 200 ms in length measured from the detection of the initial signal by the clock detection circuit 120, can be stored in the buffer 126. A 200 ms sample is sufficiently long to encode a button push from an IR remote control. If the transmission from the IR remote control is less than 200 ms, the data in the buffer 126 are padded with zeros such that the data sampling circuit 124 always generates a sample 2 kByte in length. The output of the buffer 126 is coupled to the signal conditioner 114.

Returning again to FIG. 3, the sampled data are stored in the buffer 126, which may be a portion of the memory 104 (see FIG. 2) or other suitable storage area. An error correction processor 130 analyzes the compressed data stored in the buffer 126 to detect and correct errors in the data. The data redundancy caused by the oversampling permits the detection of single bit and multiple bit data errors. Infrared transmission systems are susceptible to noise from ambient light sources, such as fluorescent lights. This sometimes causes momentary "glitches" in the TTL data stream generated by the receiver 110. However, the oversampling of the TTL data stream permits the detection of data errors by the error correction processor 130. The TTL output generated by the receiver 110 contains data having a logic 0 value or a logic 1 value. With an 80 kHz sampling rate, there are typically at least 8 to 9 sample bits per pulse from the IR receiver 110. When the sample data are converted from serial to parallel form, the result is a series of data values that are primarily 00h or FFh where "h" is used to indicate a hexadecimal number.

The error correction processor 130 searches for variations from these code sequences and corrects the variations. Each byte of data produced by the data sampling circuit 124 includes 8 sample bits. For example, the data bytes may comprise a hexidecimal sequence of:

00 01 00 00 FF FF FF FE FF 00 00 20 00 00

The error correction processor 130 analyzes the data pattern and corrects data errors. For example, the 01 data byte is considered to be a 1 bit data error because the single logic 1 data bit occurs in the middle of a series of 32 bits of logic 0 data values. The error correction processor 130 will replace the erroneous data bit with a 0 such that the first four data bytes of the above sequence would be:

00 00 00 00.

Similarly, the data byte FEh, which is contained within a series of data bytes having a value of FF, would be considered a 1 bit data error because a single logic 0 data bit occurs in the middle of a string of 40 bits of logic 1 data values. The error correction processor 130 would replace the 1 bit error in the byte FE, so that the sequence would read:

FF FF FF FF FF.

Similarly, the error correction processor 130 would replace the data byte 20h with 00h. Thus, the error correction processor 130 detects and corrects errors in the data on the receiver 110.

In an exemplary embodiment, the data can be compressed using known techniques, such as RLE compression, and then error-corrected. The error correction processor 130 can analyze the compressed data on a byte by byte basis to correct single bit data errors such as those illustrated above. For example, the data byte FEh can be corrected to FFh without the error correction processor 130 analyzing data bytes before and/or after the data byte containing the data value FEh. Thus, for simple one bit data errors, the error correction processor 130 will correct the data byte in which the error occurred without analyzing any additional data bytes. In certain situations, such as multiple data bit errors, the error correction processor may analyze a plurality of data bytes to determine the correct data value. For example, a hexadecimal sequence of:

FF 93 FF potentially contains multiple data bit errors. If the error correction processor 130 only analyzed the data byte 93h, it could not determine whether the data bit should be changed to logic zeros or logic ones. However, by analyzing the data bytes immediately preceding and immediately Following the byte in which an error likely occurred, the error correction processor 130 can determine that the data byte 93h is contained within a string of logic 1 data bit values. Therefore, the error correction processor 130 alters the data byte 93h to read FFh.

The signal conditioner 114 also includes a data compression processor 132 to compress the error-corrected data. It should be noted that the error correction processor 130 and the date compression processor 132 are typically implemented by a microprocessor (not shown) in the front-end processor 115 (see FIG. 2). However, FIG. 3 illustrates these as separate blocks since each block performs a distinct task. Although many different forms of data compression may work satisfactorily with the system 100, one implementation of the data compression processor 132 uses run length encoding (RLE). As is well known in the art, RLE is a form of data compression wherein a data value that is sequentially repeated a number of times may be represented by the data value itself followed by the number of times the data value is repeated. For example, if the data value FFh is repeated five times, it may be represented by a 2 byte RLE code (i e., FF05h). RLE data compression is particularly effective with the system 100 because most data values from the data sampling circuit 124 will be 00h or FFh. The two kBytes of error corrected data can typically be compressed to 80–250 bytes of RLE data.

The system 100 uses a particular form of RLE data compression known as carryover RLE. In carryover RLE, the data compression processor 132 performs RLE compression on every 16 sample bytes and carries over the result to the next 16 sample bytes. This permits real-time RLE data compression. Other suitable forms of real-time data compression, such as run length limiting (RLL) compression, may be used in the system 100. RLL is a particularly useful form of data compression that is commonly used on disk drives and can be readily implemented in hardware. These conventional forms of data compression are well known to those of ordinary skill in the art and need not be described in greater detail herein. However, it should be clear that any suitable form of data compression may be used with the system 100. The system 100 is directed to the remote control receiver and method of operation and is not limited by the specific form of data compression used in the circuit. Alternatively, the signal conditioner 114 need not include data compression at all. However, data compression advantageously reduces the amount of data that is processed by the system 100.

The error-corrected and compressed data are stored in a data storage area 134 which may be part of the memory 104 (see FIG. 2) or other suitable storage area. At this stage, the system 100 has received a single data command from an IR remote control. The data from the IR remote control have been sampled, error-corrected, and compressed by the system 100. The data can be used by any appliance, such as a television, video cassette recorder, stereo equipment, or the like. However, the system 100 further provides the ability for a remote control to control the operations of the target computer 105. As stated above, the target computer 105 to be controlled by the IR remote control may be a separate computer from the front-end processor 115 (see FIG. 2). Alternatively, the signal conditioner 114 may also be implemented by the target computer 105.

The system 100 has two operational modes, a "learn" mode and an "execute" mode. In the "learn" mode, the user activates one or more buttons on the IR remote control and the system 100 detects, error corrects, and compresses in the manner described above. The data corresponding to the selected IR remote control button are used to define a user-selected IR remote control command. The user may select a single button (e.g., the digit '1') or multiple buttons (e.g., the digits '123') on the IR remote control to define the user-selected IR remote control button sequence. If multiple buttons are used, conventional parsing technology may be implemented to determine when the user has completed entry of a complete sequence of buttons on the IR remote control. For example, an "ENTER" button on the IR remote control may be selected by the user to indicate the end of a button sequence.

Following completion of the IR remote control button sequence, the user may designate that IR remote control button sequence as corresponding to a user-selected command function in the target computer 105. For example, the button sequence "123" on the IR remote control may be designated as corresponding to a command to log the target computer 105 on to a computer network (not shown).

The command processor 116 analyzes the data in the data storage area 134. As will be described in greater detail below, in the learn mode, the command processor 116 instructs the user to repeat the activation of buttons on the IR remote control until the data transmitted from the IR remote control can be reliably detected and identified. Once an IR remote control button sequence can be reliably identified, the command processor 116 stores the error-corrected compressed data in the command storage area in association with the user-selected computer command. The command storage area 118 may be part of the memory 104 (see FIG. 2). In the learn mode, the user may define a plurality of remote control button sequences as corresponding to a plurality of computer commands.

It should be noted that the computer commands may be operating system commands, such as logging the target computer 105 onto a network, or commands to an application software program. For example, the user may define a remote control button sequence (e.g., the digit '9') as corresponding to a command, such as "advance slide" in an application program such as PowerPoint®. A different IR remote control button sequence (e.g., the digit '0') may be defined by the user as corresponding to "display previous slide." Thus, the user can define a variety of remote control commands as corresponding to operating system commands or application program commands. The command storage area 118 stores the user-entered IR remote control button sequence in association with the user-defined computer command. The command storage area 118 may be implemented using conventional database software. Such content-based storage systems are useful for identifying remote control button sequences when the system 100 is operating in the execute mode.

In the execute-mode, the command processor 116 analyzes a user-entered IR remote control button sequence to determine if it matches any previously defied IR remote control button sequence in the command storage area 118. If tie user-entered IR remote control button sequence matches a button sequence stored in the command storage area 118, the command processor 116 causes the target computer. 105 to execute toe user-defined computer command associated with the stored IR button sequence. Thus, in the execute mod, the command processor 116 compares a user-entered IRP remote control button sequence with one or more stored IR button sequences. A content-based storage system may be used for the command storage area 11 to simplify the process of matching the received IR remote control button sequence with one of the button sequences stored in the command storage area 118.

Figure 5A:
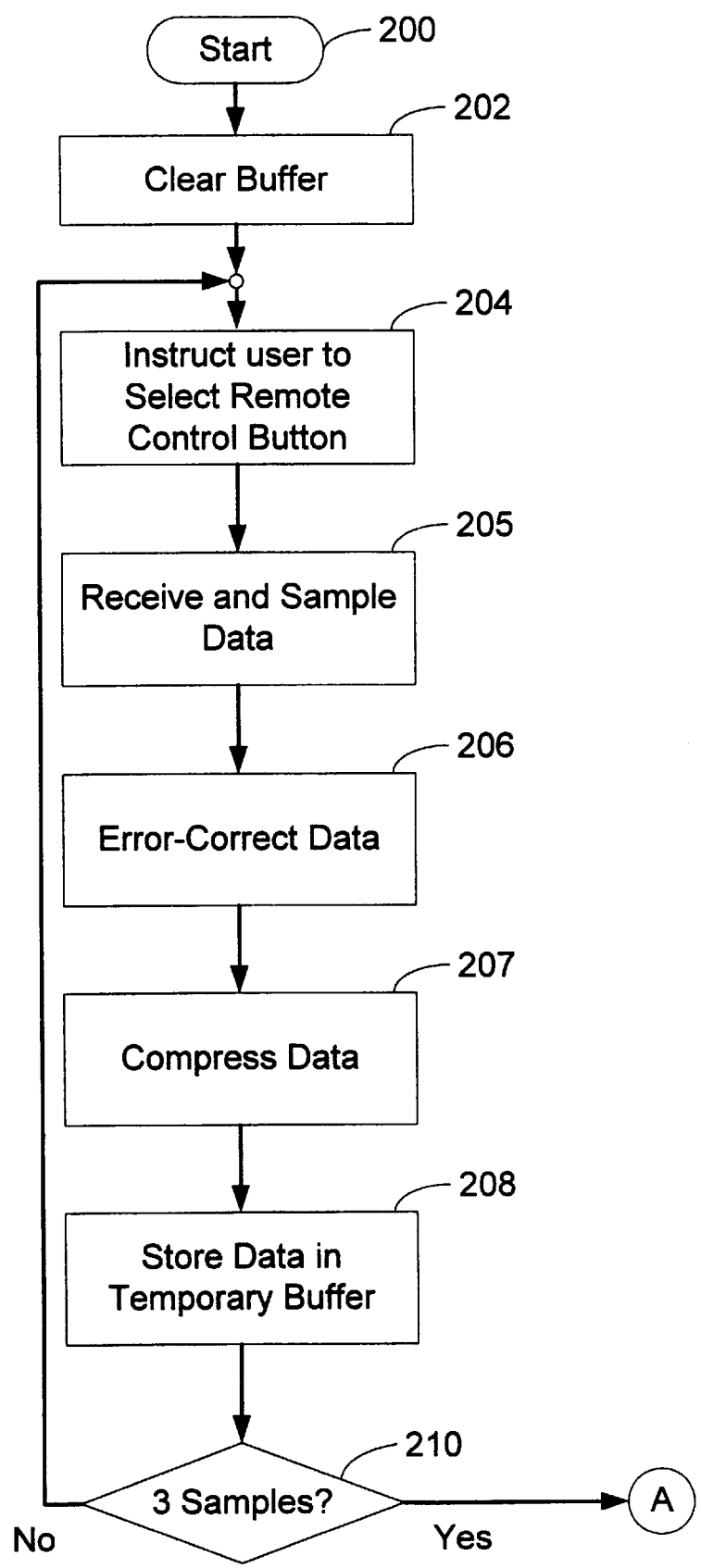
FIGS. 5A to 5C together form a flowchart of data processing performed by the system of FIG. 2 in a first operational mode.
Figure 5B:
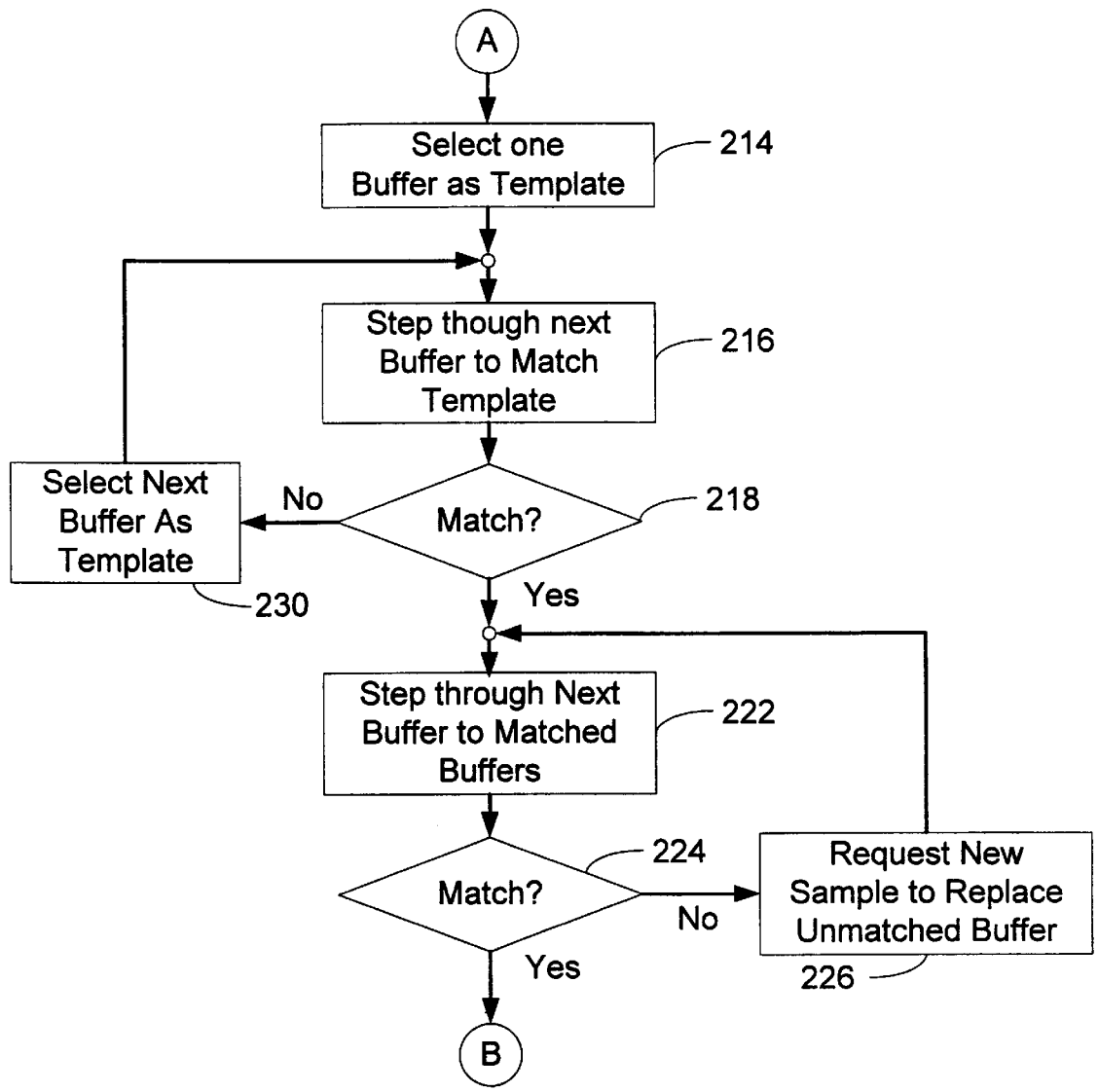
Figure 5C:
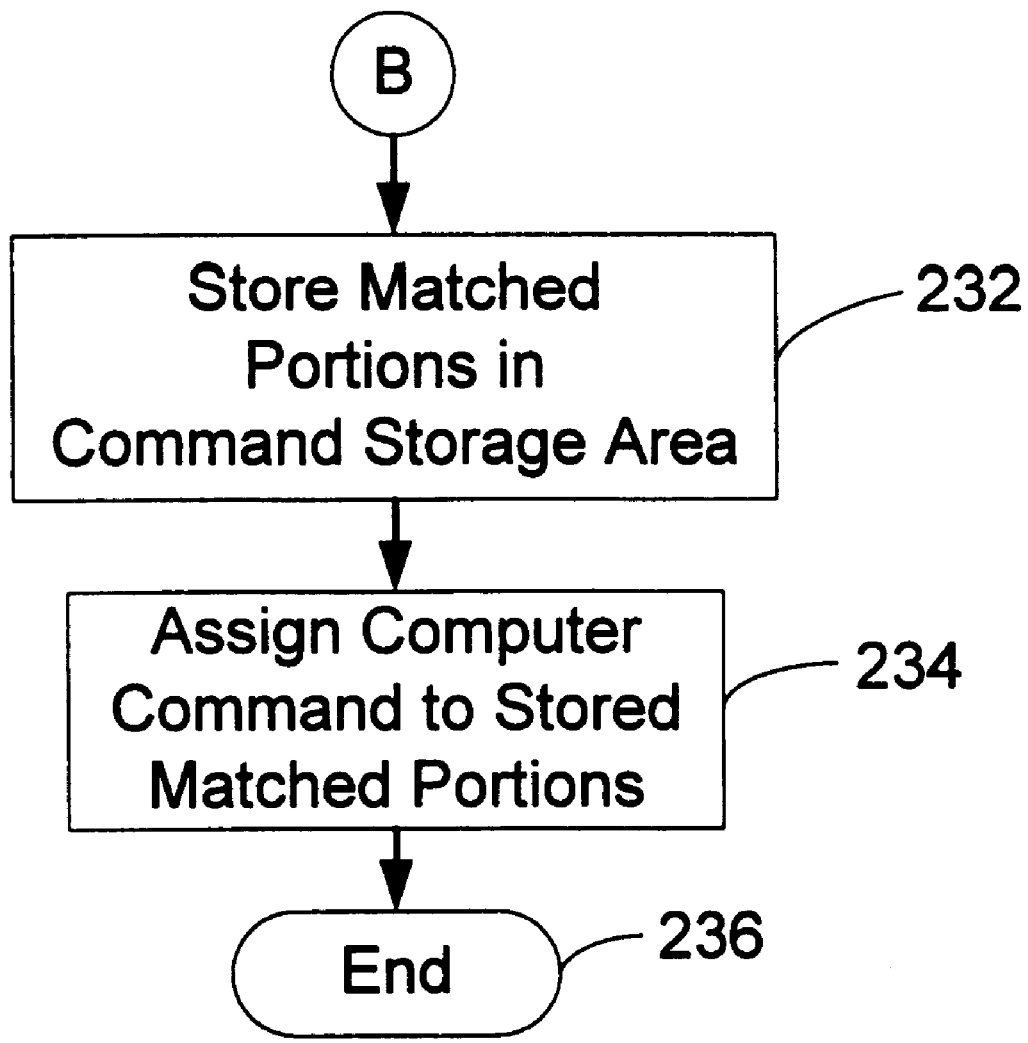

The operation of the system 100 in the learn mode is illustrated in the flow charts of FIGS. 5A to 5C, At a start 200, illustrated in FIG. 5A, the hardware processor 112 (see FIG. 3) prepares to detect data from the IR remote control. In step 202, the system 100 clears tie buffer 126 of all residual data. In step 204, the system 100 displays a message on a computer display (not shown), typically coupled to the target computer 105 (see FIG. 2), to enter a user-selected button sequence on the IR remote control Alternatively, the hardware processor 112 may include any indicator, such as ED, to indicate to the user to enter the user-selected button sequence on the IR remote control.

In step 205, the system 100 matures and-samples data transmitted from the IR remote control. The operation of the receiver 110 (see FIGS. 2–4) and the hardware processor 112 has been previously been described and need not be repeated. In step 206, the error-correction processor 130 (see FIG. 3) detects and corrects errors within the sample data in the manner previously described. The error correction process has been described above. In exemplary embodiment, the data can be compressed through an initial data compression to generate data that are error corrected. In step 207, the data compression processor 132 compresses the error-corrected data. In step. 208., the error-corrected and compressed data are stored in a temporary buffer within the memory 104 (see FIG. 2). Alternatively, any suitable storage location may be used by the system 100. As previously indicated, the error-corrected and compressed data set typically is 80 to 250 bytes in length.

In an exemplary embodiment of the system 100, the system captures three samples of the IR remote control button sequence in the learn mode. In decision 210, the system determines whether three samples are stored in temporary buffers within the memory 104. If three samples have not yet been captured, the result of decision 210 is NO. In that event, the system returns to step 204 where it displays a message to the user to enter the selected IR remote control button sequence. Steps 204 through 208 are repeated until three samples have been collected, error-corrected and compressed and stored in individual buffers within the memory 104.

When three samples of the same IR remote control command have been collected and stored in temporary buffers in the memory 104, the result of decision 210 is YES. The system 100 then analyzes the three samples to detect matching portions of the data. As is known in the art, IR remote control data are transmitted using a self-clocking system. The data sequence transmitted by the IR remote control may start in the middle of the sequence and can be repeated more than one time. Appliances, such as a remote control television, will not respond to a transmission that starts in the middle of a data sequence since the start data bits and identification data bits may not be properly transmitted. The system 100 will operate satisfactorily so long as the complete data sequence is transmitted from start to finish one time during transmission by the IR remote control. However, the system 100 captures data beginning with the first detected transition from the receiver 110 (see FIG. 2 to FIG. 4). Therefore, the error-corrected and compressed data stored in the temporary buffers will not be completely identical. The command processor 116 analyzes the data within the temporary buffers to detect portions of the data that match. It should be noted that a conventional appliance will not respond to the IR remote control until it detects start bits, identification data bits that correspond to the particular appliance, and command data bits. In contrast, the system 100 is unconcerned about the specific command transmitted by the IR remote control. Rather, the system 100 simply matches a data pattern transmitted from the IR remote control. Therefore, the system 100 does not attempt to interpret the data transmitted from the IR remote control as corresponding to a particular button (e.g., the digit "1"), but analyzes the sequence of logic 1's and 0's transmitted from the IR remote control to match data patterns rather than identify the specific command.

The data in the temporary buffers in the memory 104 are in a compressed form. It is possible to expand the compressed data prior to analysis by the command processor 116. However, one advantage of the system 100 is that it need not identify the specific command transmitted by the IR remote control, but need only recognize the data pattern transmitted by the IR remote control. Therefore, the system 100 can directly analyze compressed data stored in the temporary buffers in the memory 104.

In step 214, illustrated in FIG. 5B, the system 100 selects one of the temporary buffers to use as a template. In step 216, the system 100 steps through the next buffer byte by byte to detect a match between portions of the two temporary buffers. For example, the first temporary buffer may be selected as a template in step 214, and, in step 216, the system steps through buffer #2 in an attempt to match portions of temporary buffer #1. In decision 218, the system determines whether a match has been detected between temporary buffer #1 and temporary buffer #2. If a match has been detected, the result of decision 218 is YES. In that event, in step 222, the system 100 steps through temporary buffer #3 in an attempt to match the matched portions of temporary buffers #1 and #2.

In decision 224, the system 100 determines whether a match has been detected between temporary buffer #3 and the matched portions of temporary buffers #1 and #2. If a match was not detected between temporary buffer #3 and the matched portions of temporary buffers #1 and #2, the result of decision 224 is NO. In that event, the system 100 requests a new sample to replace the unmatched temporary buffer in step 226. In the example above, temporary buffer #3 would be replaced with a new sample from the IR remote control. Replacing the data in temporary buffer #3 requires that the system 100 capture additional data using the receiver 110 (see FIG. 2 to FIG. 4) and perform the data sampling and signal conditioning as discussed above. When a new sample has been placed in the temporary buffer #3 in the memory 104, the system returns to step 222 to analyze the new data in temporary buffer #3 to detect a match between temporary buffer #3 and the matched portions of the first two temporary buffers. This process is repeated until a match is detected.

When a match has been detected between portions of temporary buffers #1, #2, and #3, the result of decision 224 is YES.

Under optimal operating conditions, the system 100 will detect a perfect match between portions of the data in the temporary buffer #1 and the temporary buffer #2. Errors that occur in the middle of a string of data (e.g., a string of FFh data bytes or a string of 00 data bytes) have already been corrected by the error correction processor 130 (see FIG. 3) in step 206, illustrated in FIG. 5A. However, it is possible that errors can occur when the data from the receiver 110 (see FIGS. 2–4) is making a transition from a logic 1 to a logic 0 or a transition from a logic 0 to a logic 1. The transition point between a logic 0 and a logic 1 is referred to herein as a "boundary condition." At boundary conditions, the error correction processor 130 cannot rely on preceding and subsequent data bytes to determine whether variations in a particular data byte are errors, or a true transition from one logic state to another. The error correction processor 130 will not correct boundary condition errors in step 206. However, the system 100 can detect and correct boundary condition errors during the matching process.

As previously discussed, the sample rate of the sample clock 123 (see FIG. 3) is sufficiently high that a large number of samples are obtained for each pulse from the receiver 110. A typical pulse from the receiver 110 is at least 1 ms long. During the matching process, boundary conditions are analyzed and error-corrected. For example, consider the following data sequence where a series of 20 data bytes having a value FFh is followed by a single data byte having the value A3h, followed by a series of 26 data bytes having the value 00. This particular data sequence would be represented by RLE data having the following sequence:

FFh 14h A3h 00h 1Ah in which the data byte A3h represents a transition from a logic 1 to a logic 0. During the matching process, the error correction processor 130 is used to analyze one or more bytes preceding and subsequent to the data byte A3h at the boundary condition. The error correction processor 130 will alter the data byte A3h to be FFh or 00 depending on the corresponding data values in the other temporary buffers. If the system is attempting to match temporary buffer #2 using temporary buffer #1 as a template, the system will not error correct the data byte A3h until the data in temporary buffer #3 are analyzed in step 222. Based on a consensus between two of the three buffers, the error correction processor 130 will alter the data byte A3h to correspond to the matching data values in the temporary buffers. For example, if the corresponding data value in temporary buffer #1 and temporary buffer #3, both have the data value FF, the error correction processor 130 will alter the value A3h in temporary buffer #2 to be FFh. Alternatively, the system 100 can use conventional statistical techniques, such as least squares error matching methods to determine whether the value A3h should be corrected to be FFh or 00h. Following the error correction performed during the matching process, the matching portions of temporary buffers #1, #2, and #3 will be identical.

Returning to decision 218, if a match was not detected between temporary buffer #1 and temporary buffer #2, the result of decision 218 is NO. In that event, in step 230, the system 100 selects the next temporary buffer as a template. In the example above, temporary buffer #1 was initially selected as the template. In this example, temporary buffer #2 would be selected as the template by step 230. The system 100 then returns to step 216 and analyzes the next temporary buffer with respect to the selected template. In this example, in step 216, the system 100 steps through temporary buffer #3 to attempt to match to the template, which is now temporary buffer #2. Tests of the actual system have indicated that a match can typically be detected among the three buffers. However, due to external noise, the system may require the user to enter the selected IR remote control command a fourth time. Under extremely rare conditions, such as a low battery power in the IR remote control, it may not be possible to match data patterns in the temporary buffers. In that event, the system 100 can include an error message to be shown to the user on the display (not shown) indicating that a match could not be detected. Those of ordinary skill in the art will appreciate that other pattern matching approaches may be used by the system 100.

The system 100 repeats the steps illustrated in FIG. 5B until a match has been detected among portions of the three temporary buffers in the memory 104. When a match has been detected among portions of all three temporary buffers, the result of decision 224 is YES. In that event, in step 232, the system 100 stores the matched portions of the three temporary buffers in the command storage area 118 (see FIGS. 2 and 3).

In step 234, shown in FIG. 5C the system 100 allows the user to select a computer command to be associated with the IR remote control command stored in the command storage area 118. The user-selected command is also stored in the command storage area 118. The user can assign a "key" or an "action" as the command to be executed by the target computer 105 (see FIG. 2). A key may be a single keystroke, mouse event, or the like. An action can be any method on any registered control or object in the computer system. For example, an action may be a command line, such as "RUN C:WINDOWSMYPROG.BAT." Such an action would cause the target computer 105 to execute a batch program called MYPROG. As those skilled in the art can appreciate, virtually any computer operation can be controlled in this manner.

Operating systems typically include interface functions that can be readily used by the system 100 to enter commands for execution by the target computer 105. For example, Windows 95 Operating System, manufactured by Microsoft Corporation, includes a number of application programmer interface functions, designated as "WIN32API" functions. Some examples of WIN32API functions include "KEYBOARD_EVENT", "MOUSE_EVENT", "WINEXEC" ("STRING"), and the like. The KEYBOARD_EVENT function allows the user to specify a keystroke, for example, a function key, to simulate user activation of a keyboard (not shown). Similarly, the MOUSE_EVENT function allows the user to simulate a mouse event, such as clicking a mouse button (not shown). The WINEXEC ("STRING") function allows the user to enter a string, such as the RUN command described above. Other operating systems have similar application program interface functions that can be readily implemented using the system 100. The system 100 ends the learn mode operation at an end 236 after the user-selected computer command has been stored in the command storage area 118 in association with the matched portions of data corresponding to the IR remote control button sequence.

Figure 6:
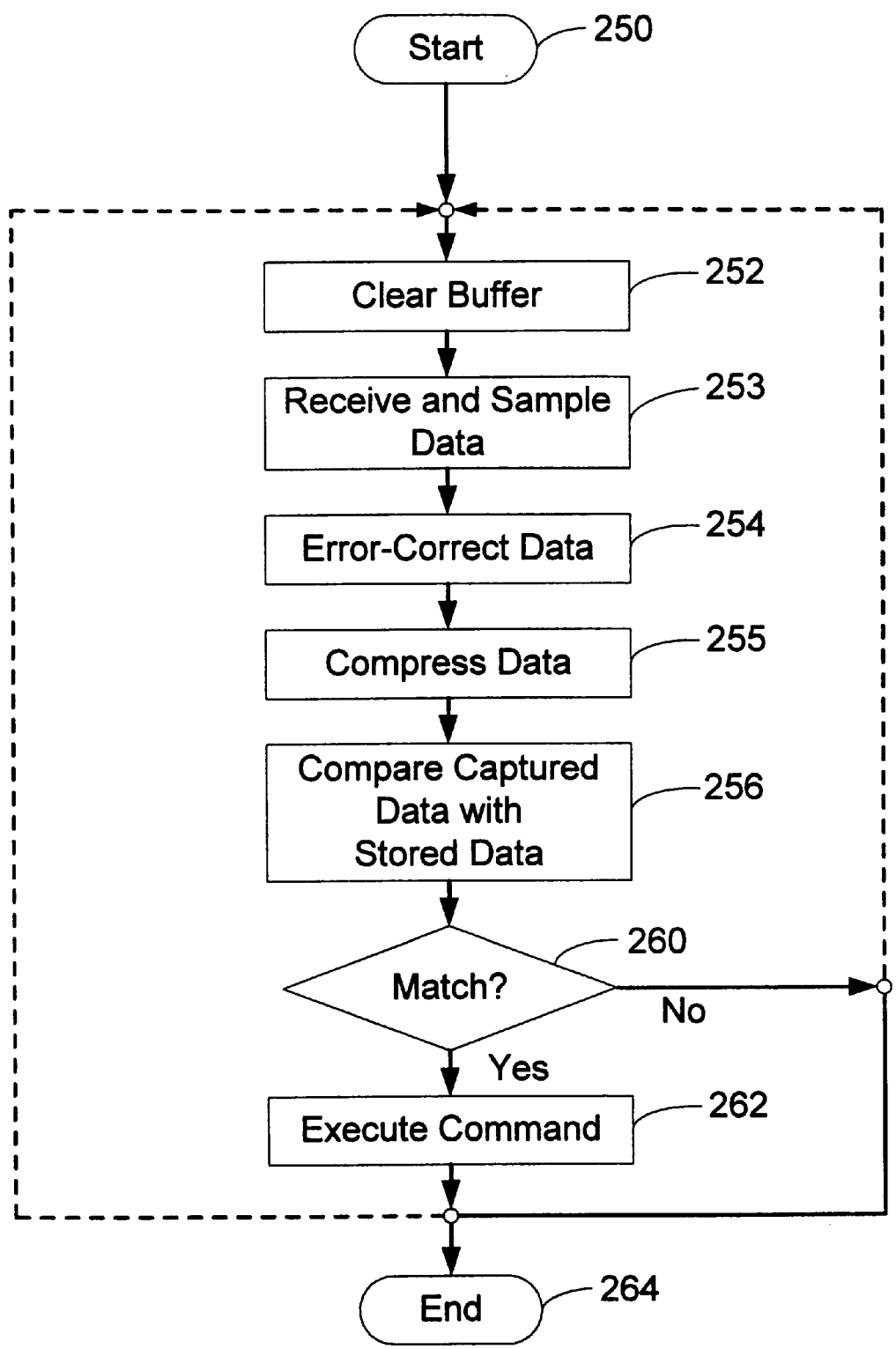
FIG. 6 is a flowchart of data processing by the system of FIG. 2 in a second operational mode.

FIG. 6 is a flow chart illustrating the operation of the system 100 in the execute mode. At a start 250, the system 100 has stored data corresponding to one or more button sequences from the IR remote control, each stored in the command storage area 118 (see FIGS. 2 and 3), each in association with a user-selected computer command to be executed by the target computer 105. In step 252, the system 100 clears the buffer 126 of all residual data. In step 253, the system 100 captures and samples data transmitted from the IR remote control. The operation of the receiver 110 (see FIGS. 2–4) and the hardware processor 112 has been previously been described and need not be repeated. In step 254, the error-correction processor 130 (see FIG. 3) detects and corrects errors within the sample data in the manner previously described. In step 255, the data compression processor 132 compresses the error-corrected data.

In step 256, the system 100 compares the error-corrected and compressed data with the stored button sequence data in the command storage area 118. When only one or two IR remote control button sequences are stored in the command storage area 118, the data captured and processed in steps 253 to 255 may be used as a template and compared with the data stored in the command storage area 118. However, as discussed above, the system 100 can be operated with a number of different IR remote controls and permits the user to define multiple commands for each of the IR remote controls. Therefore, the command storage area 118 may have a large number of data entries. To simplify the comparison between captured data and the stored data in step 256, the system 100 takes a small portion (e.g., three bytes) of each button sequence stored in the command storage area 118 and compares it with the button sequence data captured in steps 253 to 255. If a match is detected between the button sequence data captured in steps 253 to 255 and one or more of the button sequences stored in the command storage area 118, the system 100 compares the entire data entry in the command storage area to determine if a match exists between the stored button sequence data and the captured button sequence data. The error correction processor 130 (see FIG. 3) is used in a manner previously described to correct boundary condition errors. However, the error correction processor 130 will not alter the stored data, but will alter the captured button sequence data to match the stored data if such boundary condition errors are detected.

In decision 260, the system 100 determines whether a match has been detected between the captured button sequence data and the stored button sequence data. If a match has been detected, the result of decision 260 is YES and, in step 262, the system 100 causes the target computer 105 (see FIG. 2) to execute the user-selected computer command associated with the IR remote control button sequence. The system 100 ends the execute mode question at 264. Alternatively, the system 100 may operate continuously in the execute mode. In that event, the system 100 returns to step 252 to await the detection of additional transmissions from the IR remote control.

If a match was not detected between the captured data and the stored data in step 256, the result of decision 260 is NO. In that event, the system 100 moves to the end 264 without executing a computer command. As indicated above, the system 100 may also return operation to step 252 to await the entry of additional transmissions from the IR remote control. In normal operation of an IR remote control and a conventional appliance, such as a television set, the user typically selects a button a second time if the television set does not respond to the IR remote control when the button is first selected. Thus, the typical user is conditioned to repeat a remote control button selection a second time if the appliance does not respond to the remote control the first time. This is particularly useful with the system 100 in that the user simply activates the IR remote control command a second time if the system did not recognize the IR remote control command transmitted the first time. This user conditioning is useful in situations where high ambient noise results in no match between the captured data and the stored data.

Thus, the system 100 advantageously provides a universal remote control receiver capable of decoding remote control button sequences from virtually any remote control, such as a television remote control, video cassette recorder remote control, or the like. Because the remote controls from different manufacturers produce different codes, the system 100 can be programmed to recognize different user-selected remote button sequences for different remote controls. For example, the remote control button sequence '123' from a television remote control can cause the target computer 105 to perform one action while the same remote control button sequence (i.e., '123') from a video cassette recorder remote control can cause the target computer to perform the same function or a different function. Thus, the universal IR receiver of the system 100 provides great flexibility and ease of user programming. The user may readily reprogram button sequences by placing the system 100 in the learn mode and reprogramming remote control button sequences to perform a new user-designated function.

It is to be understood that even though various embodiments and advantages of the present invention have been set forth in the foregoing description, the above disclosure is illustrative only, and changes may be made in detail, yet remain within the broad principles of the invention. For example, the system 100 has been described as operating with an IR remote control. However, the principles of the present invention may be applicable through other forms of remote control. Similarly, portions of the above-described system may be implemented in the front-end processor 115 or included as part of the target computer 105. Similarly, the entire system may be implemented in the front-end processor 115 such that only the user-selected computer command is transmitted to the target computer 105 for execution. Therefore, the present invention is to be limited only by the appended claims.

What is claimed is:

1. A system for the detection and processing of a command transmitted from an infrared remote control device to control a computer, the system comprising:

an infrared remote control receiver to receive the remote command from the infrared remote control device and to generate a pulse stream in response thereto, said pulse stream including a plurality of pulses each having a leading edge and having a maximum period between said pulses;

a detection circuit to detect a first leading edge of said pulse stream;

a clock generating circuit to generate a sampling clock in response to said first leading edge, said clock generating circuit terminating said sampling clock when said maximum period expires without an additional one of said plurality of pulses;

a sampling circuit operatively receiving said sampling clock and sampling said pulse stream to generate a plurality of bit stream samples;

an error correction processor to analyze said plurality of bit stream samples and to detect and correct errors therein, said error correction processor generating a plurality of corrected bit stream samples corresponding to the remote command transmitted from the infrared remote control device;

a data compression processor to receive and compress said plurality of corrected bit stream samples; and a command processor to determine a user-selectable command corresponding to the remote command transmitted from the remote control device, said command processor passing said user-selectable command to the computer for execution.

2. The system of claim 1 wherein said data compression processor uses run-length encoding to compress said plurality of corrected bit stream samples.

3. The system of claim 1 wherein each of said plurality of pulses has a minimum pulse width and said clock generating circuit generates said sampling clock with a sampling period less than said minimum pulse width and said maximum period to permit said sampling circuit to generate a plurality of bit stream samples for each of said plurality of pulses.

4. The system of claim 3 wherein said plurality of bit stream samples are byte-packed and said error correction processor detects errors in said byte-packed data.

5. The system of claim 4 wherein said error correction processor analyzes said byte-packed data to detect a bit variation in a particular byte of said byte-packed data.

6. The system of claim 5 wherein said error correction processor alters said bit variation in said particular byte to correspond to remaining bits in said particular byte.

7. The system of claim 1, further including a database storage area to store a plurality of user-selectable commands associated with a plurality of remote commands transmitted from the infrared remote control device, said command processor determining a particular one of said plurality of user-selectable commands corresponding to the remote command transmitted from the infrared remote control device.

8. A system for the detection and processing of a command transmitted from a remote control device to control a computer, the system comprising:
a remote control receiver to receive the command from the remote control device and to generate a pulse stream in response thereto;
a sampling circuit to sample said pulse stream to generate a plurality of bit stream samples;
an error correction processor to analyze said plurality of said bit stream samples and to detect and correct errors therein, said error correction processor generating a plurality of corrected bit stream samples corresponding to the remote command transmitted from the remote control device; and
a command processor to determine a user-selectable command corresponding to the remote command transmitted from the remote control device, said command processor passing said user-selectable command to the computer for execution.

9. The system of claim 8, further including a storage location to store said user-selectable command corresponding to the remote command transmitted from the remote control device, said command processor using said remote command as a pointer to said storage location to determine said user-selectable command.

10. The system of claim 9 wherein said storage location contains a plurality of user-selectable commands corresponding to a plurality of respective remote commands transmitted from the remote control device, said command processor selecting one of said user-selectable commands corresponding to the respective remote command transmitted from the remote control device and passing said selected user-selectable command to the computer for execution.

11. The system of claim 9 wherein said command processor has first and second alternative operational modes, said command processor operational in said first mode to accept a user-selectable command and store said user-selectable command in said storage location in association with a user-entered remote command from the remote control device when in said first mode, said command processor operational in said second mode following operation in said first mode to identify said user-entered remote command transmitted from the remote control device as corresponding to said user-selectable command, said command processor passing said user-selectable command to the computer for execution.

12. The system of claim 11 wherein said command processor operates in said first mode to accept a plurality of user-selectable commands and stores each of said plurality of user-selectable commands in said storage location in association with a respective user-entered remote command transmitted from the remote control device when in said first mode, said command processor operating in said second mode following operation in said first mode to select one of said user-selectable commands corresponding to the respective remote command transmitted from the remote control device, said command processor passing said selected user-selectable command to the computer for execution.

13. The system of claim 8, further including a data compressor to receive and compress said plurality of corrected bit stream samples.

14. The system of claim 13 wherein said data compressor uses run length encoding to compress said plurality of corrected bit stream samples.

15. The system of claim 8 wherein said pulse stream comprises a plurality of pulses, each having a minimum pulse width, said sampling circuit samples said pulse stream with a period less than said minimum pulse width to generate a plurality of bit stream samples for each of said plurality of pulses.

16. The system of claim 15 wherein said plurality of bit stream samples are byte-packed and said error correction processor detects errors in said byte-packed data.

17. The system of claim 16 wherein said error correction processor analyzes said byte-packed data to detect at least a first bit variation in a particular byte of said byte-packed data.

18. The system of claim 17 wherein said error correction processor alters said bit variation in said particular byte to correspond to remaining bit data values in said particular byte.

19. A system for the detection and processing of signals transmitted from a plurality of remote control devices to control a computer, the system comprising:
a remote control receiver to receive data from one of the plurality of remote control devices and to generate a pulse stream in response thereto;
a sampling circuit to sample said pulse stream to generate a plurality of bit stream samples; and
an error correction processor to analyze said plurality of said bit stream samples and detect errors therein, whereby said error correction processor generates a plurality of corrected bit stream samples corresponding to data from the remote control device.

20. The system of claim 19, further including a data compression processor to receive and compress said plurality of corrected bit stream samples.

21. The system of claim 19 wherein said error correction processor analyzes said plurality of bit stream samples to detect variations in a particular bit of said plurality of bit stream samples with respect to adjacent bits in said plurality of bit stream samples.

22. The system of claim 21 wherein said error correction processor alters said particular bit to correspond to said adjacent bits in said plurality of bit stream samples.

23. The system of claim 19 wherein said pulse stream comprises a plurality of pulses, each having a minimum pulse width, said sampling circuit samples said pulse stream with a period less than said minimum pulse width to generate a plurality of bit stream samples for each of said plurality of pulses.

24. The system of claim 19 wherein said plurality of bit stream samples are byte-packed and said error correction processor detects errors in said byte-packed data.

25. The system of claim 24 wherein said error correction processor analyzes said byte-packed data to detect a bit variation in a particular byte of said byte-packed data.

26. The system of claim 25 wherein said error correction processor alters said bit variation in said particular byte to correspond to remaining bits in said particular byte.

27. The system of claim 19, further including a command processor to determine a particular user-selectable command corresponding to the signals transmitted from said remote control device, said command processor passing said particular user-selectable command to the computer for execution.

28. A system for the detection and processing of commands transmitted from a plurality of remote control devices, the system comprising:
 a remote control receiver to receive the commands from the remote control devices and to generate pulse streams in response thereto;
 a sampling circuit to sample said pulse streams to generate a plurality of bit stream samples;
 an error correction processor to analyze said plurality of bit stream samples and to detect and correct errors therein, said error correction processor generating a plurality of corrected bit stream samples corresponding to the remote commands transmitted from the remote control devices; and
 a command processor to determine a user-selectable command corresponding to each of the remote commands transmitted from the remote control devices.

29. The system of claim 28 wherein said user-selectable command corresponding to each of the remote commands is an identical user-selectable command.

30. A system for the detection and processing of data received from a remote control device, the system comprising:
 a sampling circuit to sample the received data to generate a plurality of data samples;
 an error correction processor to analyze said plurality of data samples and to detect and correct errors therein, said error correction processor generating a plurality of corrected data samples corresponding to a remote command received from the remote control device; and
 a command processor to determine a user-selectable command corresponding to the remote command transmitted from the remote control device.

31. The system of claim 30 wherein said command processor operates in a first mode to accept a user-selectable command and stores said user-selectable command in association with a respective user-entered remote command received from the remote control device when in said first mode, said command processor operating in a second mode following operation in said first mode to select said user-selectable command corresponding to the respective remote command received from the remote control device, said command processor passing said selected user-selectable command to the computer for execution.

32. A system for the detection and processing of signals transmitted from a remote control device to control a computer, the system comprising:
 a remote control receiver to receive data from the remote control device and to generate received data in response thereto;
 a sampling circuit to sample said received data to generate a plurality of data samples;
 an error correction processor to analyze said plurality of data samples and to detect and correct errors therein, said error correction processor generating a remote control command based on said plurality of corrected data samples; and
 a command processor having first and second alternative operational modes, said command processor operational in said first mode to accept a user-selected computer command and store said user-selected command in a storage location in association with said remote control command when in said first mode, said command processor operational in said second mode, following operation in said first mode, to identify said remote control command as corresponding to said user-selected computer command, said command processor passing said user-selected computer command to the computer for execution.

33. The system of claim 32 wherein said command processor stores a plurality of remote control commands in said storage location in association with a corresponding plurality of user-selected computer commands when said command processor is operational in said first mode, said command processor operational in said second mode to identify one of said plurality of remote control commands as corresponding to a particular one of said plurality of user-selected computer commands, said command processor passing said particular user-selected computer command to the computer for execution.

34. The system of claim 32 for use with first and second remote control devices wherein said error correction processor generates a first remote command based on said plurality of corrected data samples resulting from data received from the first remote control device and generates a second remote command based on a plurality of corrected data samples resulting from data received from the second remote control device, said command processor operates in said first mode to accept a first user-selected computer command and to store said first user-selected command in said storage location in association with said first remote control command and to accept a second user-selected computer command and to store said second user-selected command in said storage location in association with said second remote control command, said command processor operates in said second mode, following operation in said first mode, to identify said first and second remote control commands as corresponding to said first and second user-selected computer commands, respectively, and to pass said first and second user-selected computer commands to the computer for execution in response to said first and second remote control commands, respectively.

35. The system of claim 34 wherein said first and second user-selected computer commands are identical.

36. A system for the detection and processing of signals transmitted from a remote control device, the system comprising:
 a remote control receiver to detect transmissions from the remote control device and to generate received data in response thereto, said received data including a plurality of pulses each having a leading edge and having a maximum period between said pulses;
 a detection circuit to detect a first leading edge of said received data;

a clock generating circuit to generate a sampling clock in response to said first leading edge, said clock generating circuit terminating said sampling clock when said maximum period expires without an additional one of said plurality of pulses; and a sampling circuit operatively receiving said sampling clock and sampling said received data to generate a plurality of data samples, whereby the system automatically detects received data and generates an independent clock to sample said received data corresponding to the transmitted data.

37. The system of claim 36, further including an error correction processor to analyze said data samples and detect a bit variation in one data sample with respect to adjacent bits in said one data sample, said error correction processor generating a plurality of corrected data samples.

38. The system of claim 37 wherein said error correction processor alters said bit variation to correspond to said adjacent bits in said one data sample.

39. The system of claim 37, further including a data compressor to receive and compress said plurality of corrected data samples.

40. The system of claim 36 wherein each of said plurality of pulses has a minimum pulse width and said clock generating circuit generates said sampling clock with a period less than said minimum pulse width to permit said sampling circuit to generate a plurality of data samples for each of said plurality of pulses.

41. The system of claim 36, further including a command processor to determine a user-selectable command corresponding to the signals transmitted from the remote control device, said command processor passing said user-selectable command to the computer for execution.

42. A method for the detection and processing of a command transmitted from a remote control device to control a computer, the method comprising the steps of:

receiving the command from the remote control device and generating a pulse stream in response thereto;

sampling said pulse stream to generate a plurality of bit stream samples;

analyzing said plurality of said bit stream samples to detect and correct errors therein, thereby generating a plurality of corrected bit stream samples corresponding to the remote command transmitted from the remote control device;

determining a user-selectable command corresponding to the remote command transmitted from the remote control device; and passing said user-selectable command to the computer for execution.

43. The method of claim 42 wherein a storage location contains a plurality of user-selectable commands corresponding to a plurality of respective remote commands transmitted from the remote control device and said step of determining selects one of said user-selectable commands corresponding to the respective remote command transmitted from the remote control device, said step of passing using said selected user-selectable command to pass to the computer for execution.

44. The method of claim 42, further including first and second alternative operational modes, said first mode including the steps of accepting a user-selectable command and storing said user-selectable command in a storage location in association with a user-entered remote command from the remote control device when in said first mode, said second mode, following operation in said first mode, including said steps of determining and passing wherein said step of determining selects said user-selectable command associated with the remote command transmitted from the remote control device, said step of passing using said selected user-selectable command to pass to the computer for execution.

45. The method of claim 44 wherein said steps of accepting and storing said user-selectable command accept a plurality of user-selectable commands and store each of said plurality of user-selectable commands in said storage location in association with a respective plurality of user-entered remote commands transmitted from the remote control device when in said first mode, and said step of determining selects one of said plurality of user-selectable commands associated with the respective user-entered remote command transmitted from the remote control device in said second mode, said step of passing using said selected user-selectable command to pass to the computer for execution.

46. The method of claim 42, further including the step of compressing said plurality of corrected bit stream samples.

47. The method of claim 42 wherein said pulse stream comprises a plurality of pulses, each having a minimum pulse width and said step of sampling samples said pulse stream with a period less than said minimum pulse width to generate a plurality of bit stream samples for each of said plurality of pulses.

48. A method for the detection and processing of signals transmitted from a plurality of remote control devices to control a computer, the method comprising the steps of:

receiving data from one of the plurality of remote control devices and generating a data stream in response thereto;

sampling said data stream to generate a plurality of data samples; and analyzing said plurality of said data samples and detecting errors therein, whereby a plurality of corrected compressed data samples are generated corresponding to corrected data from the remote control device.

49. The method of claim 48, further including the step of compressing said plurality of data samples.

50. The method of claim 48 wherein said step of analyzing analyzes said plurality of data samples to detect variations in a particular bit of said plurality of data samples with respect to adjacent bits in said plurality of data samples.

51. The method of claim 50 wherein said step of analyzing alters said particular bit to correspond to said adjacent bits in said plurality of data samples.

52. The method of claim 48 wherein said data stream comprises a plurality of pulses, each having a minimum pulse width, and said step of sampling samples said data stream with a period less than said minimum pulse width to generate a plurality of data samples for each of said plurality of pulses.

53. The method of claim 48, further including the step of byte-packing said plurality of data samples, said step of analyzing data samples analyzing said byte-packed data samples.

54. The method of claim 53 wherein said step of analyzing analyzes said byte-packed data to detect a bit variation in a particular byte of said byte-packed data.

55. The method of claim 48, further including the steps of determining a particular user-selectable command corresponding to the signals transmitted from said one remote control device and passing said particular user-selectable command to the computer for execution.

56. A method for the detection and processing of signals transmitted from a remote control device to control a computer, the method comprising the steps of:

receiving data from the remote control device and generating a data stream in response thereto;

sampling said data stream to generate a plurality of data samples;

analyzing said plurality of data samples to detect and correct errors;

generating a remote control command based on said plurality of corrected data samples;

accepting a user-selected computer command while operating in a first operational mode;

storing said user-selected command in a storage location in association with said remote control command while in said first mode;

identifying said remote control command as corresponding to said user-selected computer command while operating in a second operational mode, following operation in said first mode; and passing said user-selected computer command to the computer for execution while in said second mode.

57. The method of claim 56 wherein said steps of accepting and storing accept and store a plurality of remote control commands in said storage location in association with a corresponding plurality of user-selected computer commands when in said first mode, said steps of identifying and passing identifying one of said plurality of remote control commands as corresponding to a particular one of said plurality of user-selected computer commands and passing said particular user-selected computer command to the computer for execution.

58. The method of claim 56 for use with first and second remote control devices wherein said step of generating generates a first remote command based on said plurality of corrected data samples resulting from data received from the first remote control device and generates a second remote command based on said plurality of corrected data samples resulting from data received from the second remote control device, said steps of accepting and storing operate in said first mode to accept a first user-selected computer command and to store said first user-selected command in said storage location in association with said first remote control command and to accept a second user-selected computer command and to store said second user-selected command in said storage location in association with said second remote control command, said steps of identifying and passing operate in said second mode, following operation in said first mode, to identify said first and second remote control commands as corresponding to said first and second user-selected computer commands, respectively, and to pass said first and second user-selected computer commands to the computer for execution in response to said first and second remote control commands respectively.

59. The method of claim 58 wherein said first and second user-selected computer commands are identical.

60. A method for the detection and processing of signals transmitted from a remote control device, the method comprising the steps of:

receiving data from the remote control device and generating a data stream in response thereto, said data stream including a plurality of pulses each having a leading edge and having a maximum period between said pulses;

detecting a first leading edge of said data stream;

generating a sampling clock in response to said first leading edge;

terminating said sampling clock when said maximum period expires without an additional one of said plurality of pulses; and operatively receiving said sampling clock and sampling said data stream to generate a plurality of data samples, whereby the received data is automatically detected and an independent clock signal generated to sample the data stream corresponding to said received data.

61. The method of claim 60, further including the steps of analyzing said data samples and detecting a bit variation in said plurality of data samples with respect to adjacent bits in said plurality of data samples.

62. The method of claim 60, further including the steps of determining a user-selectable command corresponding to the signals transmitted from the remote control device and passing said user-selectable command to the computer for execution.

63. A computer readable medium containing instructions for a computer to detect and process a remote command transmitted from a remote control device for controlling a target computer, the instructions causing the computer to perform the steps comprised of:

receiving the remote command and generating a pulse stream in response thereto;

sampling said pulse stream to generate a plurality of bit stream samples;

analyzing said plurality of said bit stream samples to detect and correct errors therein, thereby generating a plurality of corrected bit stream samples corresponding to the remote command;

determining a user-selectable command corresponding to the remote command; and passing said user-selectable command to the target computer for execution.

64. The computer readable medium of claim 63 wherein a storage location in the computer contains a plurality of user-selectable commands corresponding to a plurality of respective remote commands transmitted from the remote control device and said step of determining selects one of said user-selectable commands corresponding to the respective remote command transmitted from the remote control device, and said step of passing said selected user-selectable command passes the one of said user-selectable commands corresponding to the remote command to the target computer for execution.

65. The computer readable medium of claim 63, further containing computer instructions to cause the computer to operate in first and second alternative operational modes, said first mode including the steps of accepting a user-selectable command and storing said user-selectable command in a storage location in association with a user-entered remote command from the remote control device when in said first mode, said second mode, following operation in said first mode, including said steps of determining and passing wherein said step of determining selects said user-selectable command associated with the remote command transmitted from the remote control device, said step of passing using said selected user-selectable command to pass to the target computer for execution.

66. A computer readable medium containing instructions for a computer to detect and process signals transmitted from a plurality of remote control devices, the instructions causing the computer to perform the steps comprised of:

receiving data from one of the plurality of remote control devices and generating a data stream in response thereto;

sampling said data stream to generate a plurality of data samples; and analyzing said plurality of said data samples and detecting errors therein, whereby a plurality of corrected compressed data samples are generated corresponding to corrected data from the remote control device.

67. The computer readable medium of claim 66, further including instructions causing the computer to perform the step of compressing said plurality of data samples.

68. A computer readable medium containing instructions for a computer to detect and process signals transmitted from a remote control device for controlling a target computer, the instructions causing the computer to perform the steps comprised of:

receiving data from the remote control device and generating a data stream in response thereto;

sampling said data stream to generate a plurality of data samples;

analyzing said plurality of data samples to detect and correct errors;

generating a remote control command based on said plurality of corrected data samples;

accepting a user-selected computer command while operating in a first operational mode;

storing said user-selected command in association with said remote control command while in said first mode;

identifying said remote control command as corresponding to said user-selected computer command while operating in a second operational mode, following operation in said first mode; and passing said identified user-selected computer command to the target computer for execution while in said second mode.

* * * * *

UNITED STATES PATENT AND TRADEMARK OFFICE
CERTIFICATE OF CORRECTION

PATENT NO. : 6,097,520
DATED : August 1, 2000
INVENTOR(S) : Kadnier

It is certified that error appears in the above-identified patent and that said Letters Patent is hereby corrected as shown below:

Column 1,
Line 48, "Figures" should read -- figures --.

Column 2,
Line 48, "emote" should read -- remote --.

Column 7,
Line 16, "bit" should read -- bits --.
Line 18, "Following" should read -- following --.

Column 9,
Line 7, "tie" should read -- the --.
Line 9, "computer. 105" should read -- computer 105 --.
Line 12, "mod" should read -- mode --.
Line 13, "IRP" should read -- IR --.
Line 15, "11" should read -- 118 --.
Line 29, "ED" should read -- LED --.
Line 31, "matures" should read -- captures --.
Line 42, "208.," should read -- 208, --.

Column 11,
Line 56, "methods to" should read -- methods, to --.

Column 12,
Line 35, "C:WINDOWSMYPROG.BAT." should read -- C:\WINDOWS\MYPROG.BAT --.

UNITED STATES PATENT AND TRADEMARK OFFICE
CERTIFICATE OF CORRECTION

PATENT NO.    : 6,097,520
DATED         : August 1, 2000
INVENTOR(S)   : Kadnier It is certified that error appears in the above-identified patent and that said Letters Patent is hereby corrected as shown below:

Column 13,
Line 47, "question" should read -- operation --.

Signed and Sealed this

Eleventh Day of November, 2003

JAMES E. ROGAN
*Director of the United States Patent and Trademark Office*